United States Patent
Efrat et al.

(10) Patent No.: US 12,037,270 B2
(45) Date of Patent: Jul. 16, 2024

(54) REVERSE OSMOSIS SYSTEM WITH FLUIDIZED BED CRYSTALLIZER

(71) Applicant: I.D.E. TECHNOLOGIES LTD, Kadima (IL)

(72) Inventors: Tomer Efrat, Kadima (IL); Alex Drak, Kadima (IL)

(73) Assignee: IDE WATER TECHNOLOGIES LTD., Kadima (IL)

( * ) Notice: Subject to any disclaimer, the term of this patent is extended or adjusted under 35 U.S.C. 154(b) by 256 days.

(21) Appl. No.: 16/099,432

(22) PCT Filed: Jul. 4, 2017

(86) PCT No.: PCT/IB2017/054029
§ 371 (c)(1),
(2) Date: Nov. 6, 2018

(87) PCT Pub. No.: WO2018/007943
PCT Pub. Date: Jan. 11, 2018

(65) Prior Publication Data
US 2019/0144306 A1 May 16, 2019

(30) Foreign Application Priority Data
Jul. 6, 2016 (GB) ...................... 1611759

(51) Int. Cl.
*C02F 1/44* (2023.01)
*B01D 9/00* (2006.01)
(Continued)

(52) U.S. Cl.
CPC ............ *C02F 1/441* (2013.01); *B01D 9/0036* (2013.01); *B01D 61/026* (2022.08);
(Continued)

(58) Field of Classification Search
CPC ................ B01D 61/022; B01D 9/0036; B01D 2311/04; B01D 2311/06; B01D 2311/25;
(Continued)

(56) References Cited

U.S. PATENT DOCUMENTS 3,428,446 A * 2/1969 Locke, Jr. ........... C21B 13/0033
75/451
2008/0169098 A1 * 7/2008 Christopher .......... E21B 43/385
166/275

(Continued)

FOREIGN PATENT DOCUMENTS

JP      2001058102 A        3/2001
KR    20070118056 A  *  12/2007
(Continued)

OTHER PUBLICATIONS

Mahvi et al., Feasibility study of crystallization process for water softening in a pellet reactor, Dec. 2005, p. 1-5 (Year: 2005).*
(Continued)

*Primary Examiner* — Patrick Orme
(74) *Attorney, Agent, or Firm* — Fresh IP PLC; Clifford D. Hyra; Aubrey Y. Chen

(57) ABSTRACT

A reverse osmosis desalination system for treating feed water, the feed water containing minerals, the system comprising a reverse osmosis unit comprising a first reverse osmosis stage (21) and a second reverse osmosis stage (22), each of the reverse osmosis stages (21, 22) having a feed water input, a product water outlet and a brine outlet, and a fluidized bed crystallizer (30), configured to remove minerals from the water, wherein the fluidized bed crystallizer (30) receives brine from the first reverse osmosis stage (21) and passes treated water to the feed water input of the second reverse osmosis stage (22).

20 Claims, 4 Drawing Sheets

(51) Int. Cl.
*B01D 61/02* (2006.01)
*C02F 103/08* (2006.01)
*C02F 1/52* (2023.01)
*C02F 101/12* (2006.01)

(52) U.S. Cl.
CPC ...... *B01D 2311/04* (2013.01); *B01D 2311/06* (2013.01); *B01D 2311/2523* (2022.08); *B01D 2311/26* (2013.01); *C02F 2001/5218* (2013.01); *C02F 2101/12* (2013.01); *C02F 2103/08* (2013.01); *C02F 2201/002* (2013.01); *C02F 2301/08* (2013.01); *Y02A 20/124* (2018.01); *Y02A 20/131* (2018.01)

(58) Field of Classification Search
CPC ............ B01D 2311/26; B01D 2311/12; B01D 1/26; B01D 2311/08; B01D 2311/18; B01D 2311/2642; B01D 1/28; B01D 1/2884; B01D 1/2887; B01D 1/289; B01D 1/2893; B01D 2317/022; B01D 2321/168; B01D 3/065; B01D 5/0057; B01D 5/006; B01D 5/0069; B01D 5/0075; B01D 61/025; B01D 61/04; B01D 65/08; B01D 61/02; B01D 61/002; B01D 61/42; B01D 61/58; B01D 61/427; C02F 2001/5218; C02F 2001/12; C02F 2103/08; C02F 2201/002; C02F 2301/08; C02F 1/441; C02F 1/38; C02F 1/52; C02F 2101/10; C02F 2301/043; C02F 2303/22; C02F 11/122; C02F 1/004; C02F 1/041; C02F 1/042; C02F 1/06; C02F 1/385; C02F 1/442; C02F 1/444; C02F 1/4693; C02F 1/5236; C02F 1/56; C02F 1/66; C02F 1/68; C02F 1/705; C02F 2001/007; C02F 2101/101; C02F 2101/103; C02F 2101/106; C02F 2101/12; C02F 2101/163; C02F 2101/20; C02F 2103/023; C02F 2103/06; C02F 2103/10; C02F 2301/046; C02F 2305/12; C02F 3/1273; C02F 3/30; C02F 5/10; C02F 9/00; C02F 3/2833; C02F 3/085; Y02A 20/124; Y02A 20/131; Y02A 20/132; Y02A 20/128; Y02A 20/152; Y02A 20/156; C21B 13/0033; Y02P 10/134; Y02W 10/10; Y02W 10/15; B22D 11/1241; C07K 1/34; C01C 1/0429; C12M 25/20; B01J 8/18; Y10S 118/05; Y10S 159/03; Y10S 425/02; Y10S 524/909

See application file for complete search history.

(56) References Cited

U.S. PATENT DOCUMENTS

2016/0198721 A1* 7/2016 Yoshikawa ............. C02F 1/766
                                                                424/723
2018/0311618 A1* 11/2018 Benton ................... C12H 3/04

FOREIGN PATENT DOCUMENTS

KR        101346319 B1 * 12/2013
KR        101346319 B1   12/2013

OTHER PUBLICATIONS

Cotruvo, Desalination Guidelines Development for Drinking Water: Background, Aug. 2004, p. 7 (Year: 2004).*
Water Technology; Membrane Fundamentals, Part3: Effect of pH, Temperature Chemicals and Cleaning Procedures vs. Foulant Removal; Sep. 1, 2006; p. 1-3 (Year: 2006).*
Stoughton et al, Reverse Osmosis Optimization, Aug. 2013, Pacific Northwest National Laboratory, p. 11,20 (Year: 2013).*
International Search Report dated Sep. 12, 2017 for PCT/IB2017/054029.
Rick Bond et al: "Zero Liquid Discharge for Inland Desalination", retrieved from the Internet: URL:http://www.waterrf.org/PublicReportLibrary/91190.pdf, Jan. 1, 2007.
Perez-Gonzalez A et al: "State of the art and review on the treatment technologies of water reverse osmosis concentrates" water research, elsevier, Oct. 20, 2011, pp. 267-283, vol. 46, Amsterdam, NL.
Bond et al., "Zeroing in on ZLD for Inland Desalination", Journal of the American Water Works Association, Sep. 2008, pp. 76-89, vol. 100, Issue 9, American Water Works Association, Denver, U.S.
Examiner Requisition, Canadian Patent Application No. 3,023,397, dated Jul. 6, 2020.
Search Report, Brazilian Patent Application No. BR112018076079-0, dated Jun. 8, 2021.

* cited by examiner

REVERSE OSMOSIS SYSTEM WITH FLUIDIZED BED CRYSTALLIZER

This application claims the benefit of Great Britain Patent Application No. 1611759.0, filed Jul. 6, 2016, which is hereby incorporated by reference in its entirety.

This invention relates to a reverse osmosis system and a method of operating a reverse osmosis system.

BACKGROUND TO THE INVENTION

Reverse osmosis is a well-known method for treating feed water, in particular brackish or sea water, by applying pressure to the feed water to force the water through a semi-permeable membrane against the gradient of osmotic pressure, while dissolved minerals are blocked by the membrane. Conventionally, sea water desalination plants use a double pass system, in which permeate water from a first reverse osmosis system, or first pass, is supplied as feed water to a second reverse osmosis system, or second pass. By doing so, a much higher quality of product water is obtained.

A problem with this method is that of rejecting borate ions from the feed water. In particular, boric acid is undesirable in water for use in agriculture. In addition, the presence of sparingly soluble salts, such as calcium or magnesium salts, limits the possible recovery in the second pass, where high recovery can result in scaling of the membrane. In order to prevent scaling of the membrane, various methods are used, including using anti-scalant chemicals. Raising the pH of the feed water enables boric acid to be rejected as borate ions, but raising the water pH in this way further enhances the likelihood of precipitation and scaling.

SUMMARY OF THE INVENTION

According to a first aspect of the invention there is provided a reverse osmosis desalination system for treating feed water, the feed water containing minerals, the system comprising a reverse osmosis unit comprising a first reverse osmosis stage and a second reverse osmosis stage, each of the reverse osmosis stages having a feed water input, a product water outlet and a brine outlet, and a fluidized bed crystallizer, configured to remove minerals from the water, wherein the fluidized bed crystallizer receives brine from the first reverse osmosis stage and passes treated water to the feed water input of the second reverse osmosis stage.

The second reverse osmosis stage may be downstream of the first reverse osmosis stage.

The second reverse osmosis stage may be a final reverse osmosis stage.

The second reverse osmosis stage may be upstream of the first reverse osmosis stage, the fluidized bed crystallizer being located in a brine recycling line, such that brine from the second reverse osmosis stage is supplied to the feed water input of the first reverse osmosis stage.

The system may comprise at least one further reverse osmosis stage having a feed water input, the fluidized bed crystallizer further passing treated water to the feed water input of the at least one further reverse osmosis stages.

The brine outlet of the second reverse osmosis stage may be connected to the feed water input of the first reverse osmosis stage.

The system of may comprise a first reverse osmosis pass and a second reverse osmosis pass, the second reverse osmosis pass comprising the first reverse osmosis stage and the second reverse osmosis stage.

The system of may comprise a post-treatment unit, the post-treatment unit receiving at least a portion of the minerals removed by the fluidized bed crystallizer and being operable to reintroduce minerals to product water.

The dissolved minerals may be are calcium and/or magnesium compounds.

The system of may comprise a plurality of fluidized bed crystallizers, each of the fluidized bed crystallizers being disposed between a pair of reverse osmosis stages.

The fluidized bed crystallizer may be configured to precipitate said minerals on a seed material.

According to a second aspect of the invention there is provided a method of operating a reverse osmosis desalination system for treating feed water comprising receiving brine from a brine outlet of a first reverse osmosis stage, passing the brine to a fluidized bed crystallizer, and passing treated water from the fluidized bed crystallizer to a feed water inlet of a second reverse osmosis stage.

The second reverse osmosis stage may be downstream of the first reverse osmosis stage.

The second reverse osmosis stage may be upstream of the first reverse osmosis stage, the method comprising supplying brine from brine outlet of the second reverse osmosis stage to the feed water input of the first reverse osmosis stage The method may comprise introducing at least some of the minerals removed by the at least one fluidized bed crystallizer into a post-treatment unit to re-mineralize the water.

BRIEF DESCRIPTION OF THE DRAWINGS

Embodiments of the invention are described by way of example only with reference to the accompanying drawing, wherein.

DETAILED DESCRIPTION OF THE PREFERRED EMBODIMENTS

Figure 1:
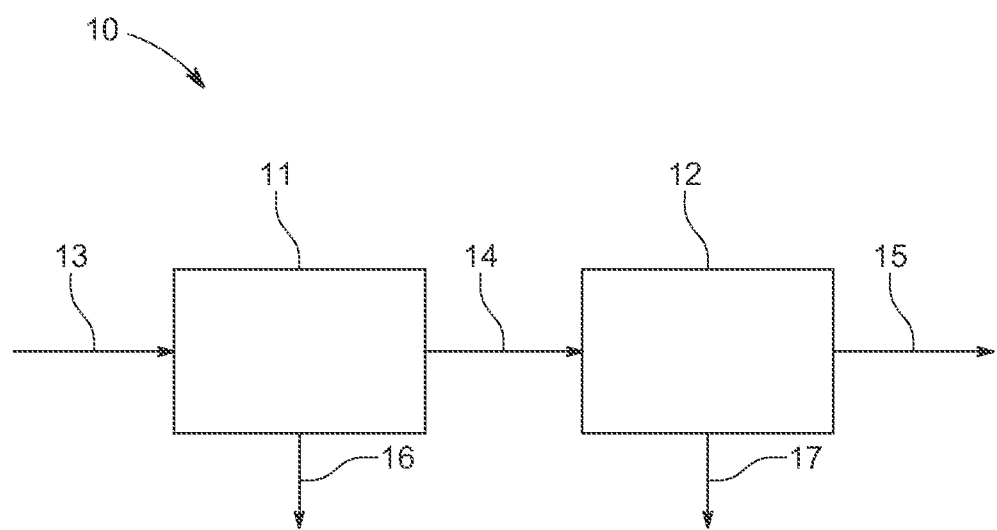
FIG. 1 is an illustration of a two-pass reverse osmosis system.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Referring now to FIG. 1, a reverse osmosis system is generally shown at 10, comprising a first reverse osmosis pass 11 and a second reverse osmosis pass 12. Each pass has a plurality of reverse osmosis stages, each stage comprising one or more pressure vessels with a plurality of semipermeable membranes. Feed water, such as sea water, is supplied under pressure on line 13 to an inlet of the first pass 11. Permeate or product water from an outlet of first pass 11 is supplied on line 14 to an inlet of second pass 12. Product water is received from the second pass 12 on line 15. Effluent water with a higher concentration of dissolved minerals, referred to as brine, is removed from first pass 11 on line 16 and from second pass 12 on line 17. Brine from line 16 and 17 may be recirculated into the feed water of the first pass 11 or second pass 12. Feed water on line 13 may be pre-treated, and product water on line 15 may be post-treated.

A part of the system 10 is shown at 20, comprising a first reverse osmosis stage 21 and a second reverse osmosis stage 22. In this example, the second reverse osmosis stage 22 is downstream of the first reverse osmosis stage 21, that is the principal supply of feed water to second reverse osmosis stage 22 comes from first reverse osmosis stage 21. Feed water is supplied on line 23 to an inlet of first reverse osmosis stage 21. Product water from a product water outlet of first reverse osmosis stage 21 is removed on line 24. Brine from a brine outlet of first reverse osmosis stage 21 is supplied on line 25 to second reverse osmosis stage 22. Product water from a product water outlet of second reverse osmosis stage 22 is similarly removed on line 24. Brine from a brine outlet of second reverse osmosis stage 21 is removed on line 26, potentially to be passed to a further reverse osmosis stage or to a brine recycling line as discussed in more detail below.

To remove dissolved minerals from the brine supplied to the second reverse osmosis stage 22 and allow operation of the stage at a higher pH, a fluidized bed crystallizer 30 is provided on line 25. In a fluidized bed crystallizer, water to be treated is forced upwardly through a bed of seed particles such as sand, so that the seed particles are in suspension. Dissolved minerals precipitate onto the seed particles and fall to a lower part of the apparatus, thus reducing the dissolved solid in the feed water and allow the precipitated minerals to be easily removed. A salt removal line 31 is connected to the fluidized bed crystallizer 30, to receive the removed minerals. Accordingly, by passing the feed water through the fluidized bed crystallizer in this way, the total dissolved solids in the feed water can be reduced.

Figure 2:
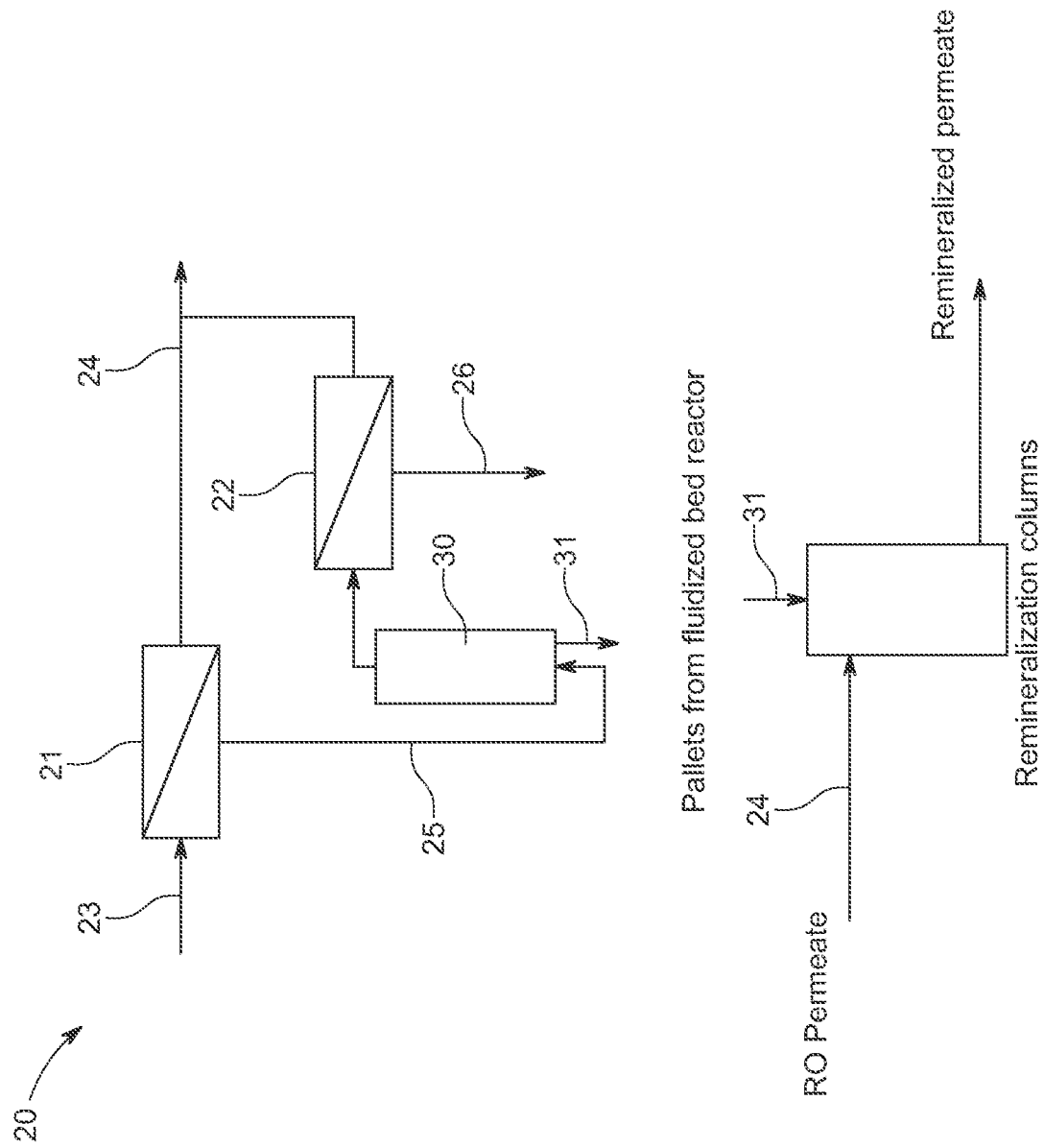
FIG. 2 is an illustration of a reverse osmosis system including two reverse osmosis stages and a fluidized bed crystallizer.
Figure 3:
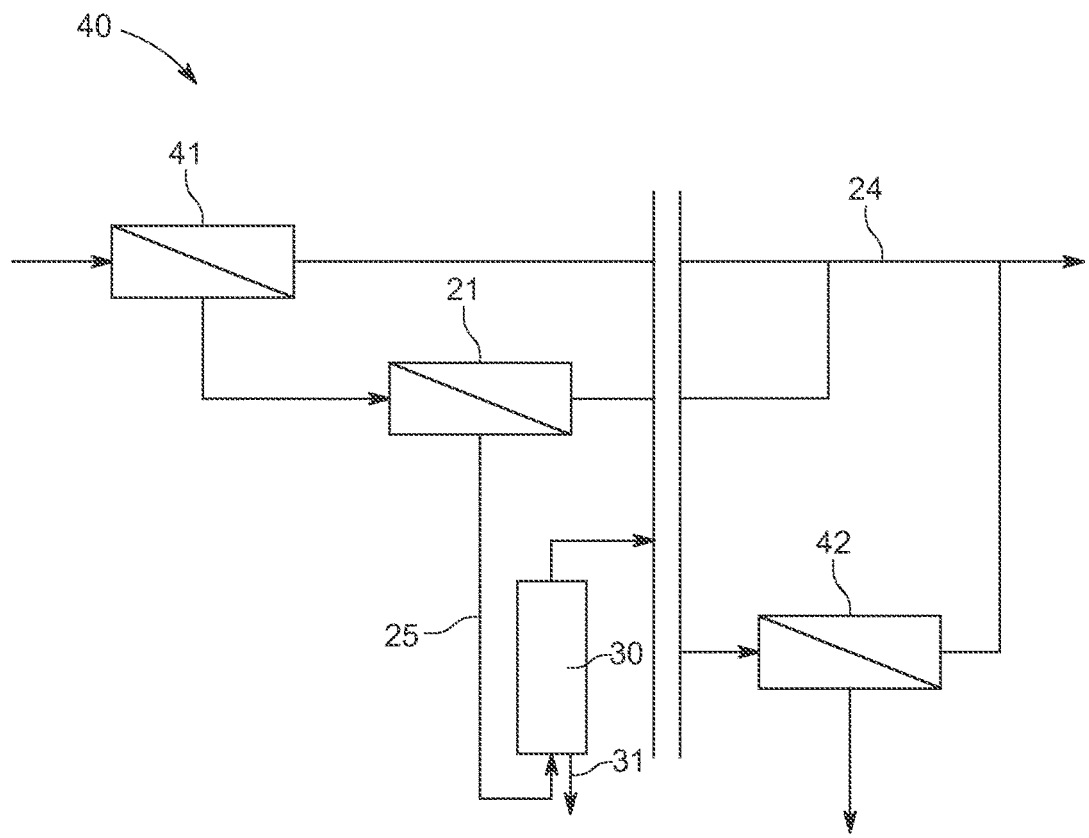
FIG. 3 is an illustration of a further reverse osmosis system similar to the system of FIG. 2.
Figure 3A:
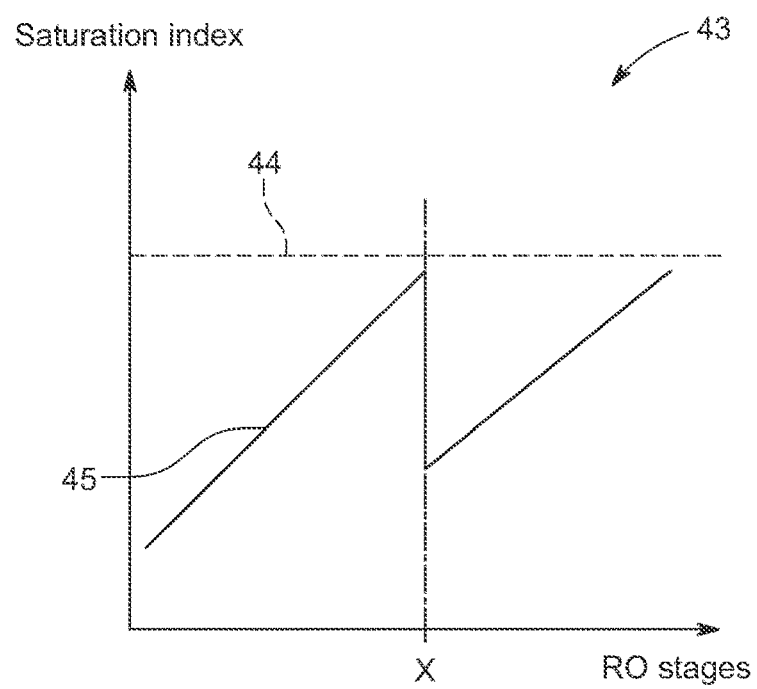
FIG. 3a is a graph illustrating the concentration of dissolved minerals in the system of FIG. 3.

The second reverse osmosis stage 22 may be the final stage in the pass. Alternatively, the fluidized bed crystallizer 30 may be located between any other pair of reverse osmosis stages. In particular, as the concentration of dissolved minerals in the brine supplied as feed water increases, the saturation index of the feed water will increase. By locating a fluidized bed crystallizer 30 between stages where the brine concentration is approaching its maximum saturation, the concentration can then be reduced and limit precipitation and scaling in the subsequent stage. This is illustrated with reference to FIGS. 3 and 3a. FIG. 3 shows a part of system 10, generally shown at 40, including first reverse osmosis stage 21, and further osmosis stages 41, 42. Further reverse osmosis stage 41 is upstream of first reverse osmosis stage 21, as brine from a brine outlet of reverse osmosis stage 41 is supplied to a feed water inlet of first reverse osmosis stage 21. Further reverse osmosis stage 42 is disposed downstream of first reverse osmosis stage, and may be immediately downstream of first reverse osmosis stage 21 (i.e. in similar manner to second reverse osmosis stage 22 of FIG. 2) or there may be multiple stages in between reverse osmosis stages 21 and 42.

Graph 43 shows the concentration of dissolved minerals in the feed water in the system 40 as it progresses through subsequent stages. The concentration can be any index, for example the Stiff & Davis saturation index. The maximum S&D saturation is shown by dashed line 44. As shown by line 45, the concentration will steadily increase (as water is removed as product water by passing through the semipermeable membranes). By locating a fluidized bed crystallizer at point X, before the saturation index reaches the maximum saturation level, the concentration can be sharply reduced and the risk of precipitation and scaling reduced.

By interposing a fluidized bed crystallizer 30 in the sequence of stages in this way, the entire second pass 12 can be operated at a higher pH level, for example at least pH 11, and recovery level without causing scaling or precipitation or requiring chemical treatment to prevent or reduce scaling. The increased pH level thus allows boric acid to be rejected as borate ions, meeting the required water quality limits. The pH level may be increased by treating the feed water supplied to reverse osmosis stage 54, or at any point in the brine recycling circuit.

If required, the pH of the feed water can be increased before it is supplied to the fluidized bed crystallizer, for example by the addition of sodium hydroxide or calcium hydroxide. As a result of the precipitation of sparingly soluble salts in the fluidized bed crystallizer, the pH will be subsequently decreased. In addition, if required, the pH of fluidized bed crystallizer effluent can be further decreased by the addition of acid. The use of additional treatment chemicals may not be required however, depending on the pH of the feed water and effluent, providing that the pH of the water supplied from the fluidized bed crystallizer to the subsequent reverse osmosis stage is at a desired operating level as discussed above.

Although a single fluidized bed crystallizer 30 is shown, a plurality of fluidized bed crystallizers may be provided, located between stages as appropriate whenever the saturation index approaches the maximum value.

Figure 4:
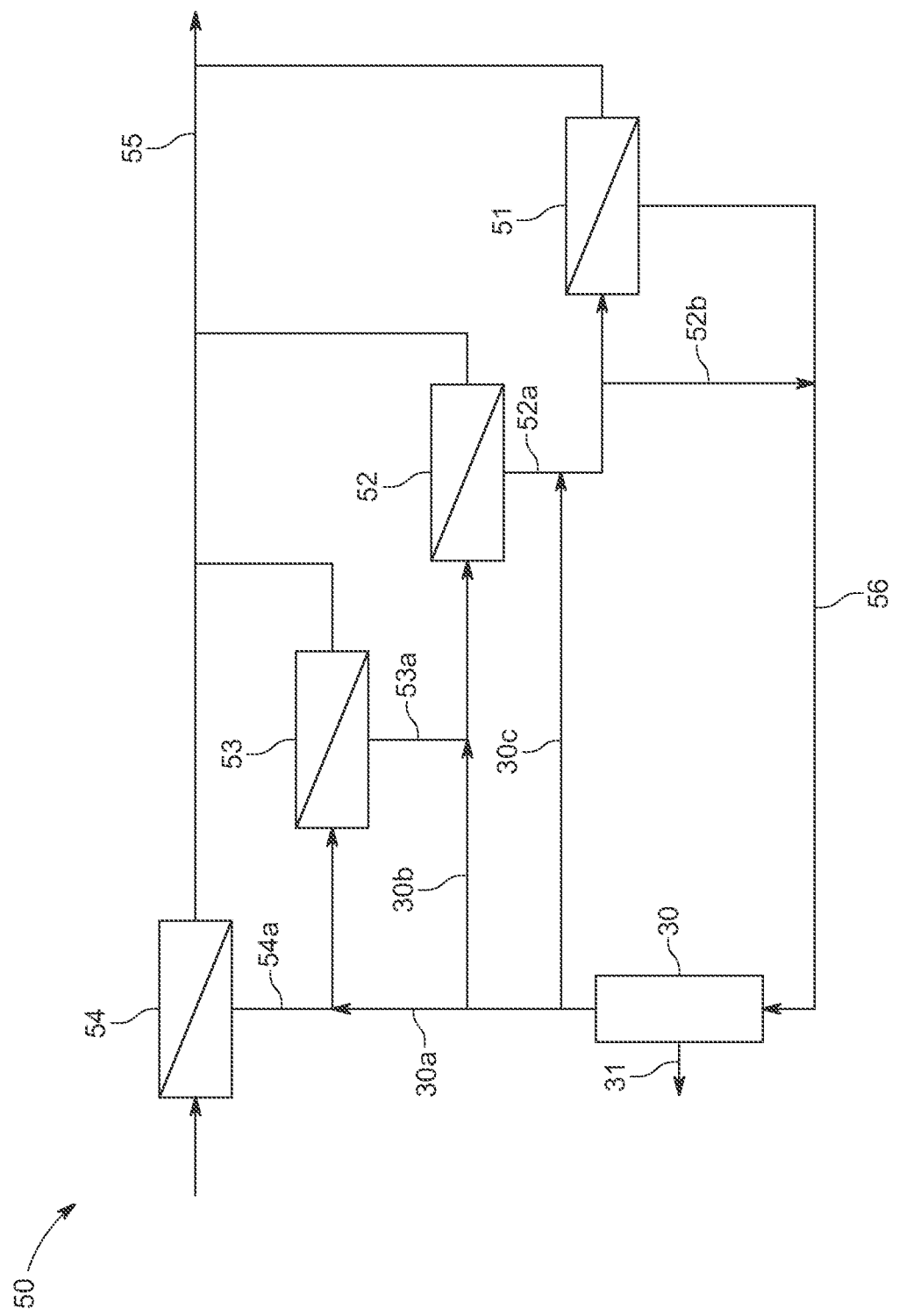
FIG. 4 is an illustration of a further reverse osmosis system.

In an alternative configuration as shown at 50 in FIG. 4, a fluidized bed crystallizer 30 is located in a brine recycling line. A plurality of reverse osmosis stages, in this example four, are shown at 51 to 54. Brine from the brine outlet of reverse osmosis stage 54 is supplied to reverse osmosis stage 53 on line 54a, brine from the brine outlet of reverse osmosis stage 53 is supplied to reverse osmosis stage 52 on line 53a and brine from the brine outlet of reverse osmosis stage 52 is supplied to reverse osmosis stage 51 on line 52a. Product water from the product water outlets of reverse osmosis stages 51 to 54 is removed on line 55.

As shown by brine recycling line 56, brine from the first reverse osmosis stage is passed to fluidized bed crystallizer 30. Dissolved minerals are removed from the brine and removed as shown by 31, and the treated brine supplied to one or more of reverse osmosis stages 52 and 53 as shown by lines 30a, 30b. In this example, the reverse osmosis stage 52 or 53 is regarded as the second reverse osmosis stage, in that it receives brine from first reverse osmosis stage 51 at a feed water inlet via the fluidized bed crystallizer 30, and is upstream of first reverse osmosis stage 51 in that brine from the second reverse osmosis stage is the principal component of the feed water supplied to first reverse osmosis stage 51. In addition, water from the fluidized bed crystallizer 30 may be supplied back to first reverse osmosis stage 51 as shown by line 30c. Further additionally, a part of the brine from the brine outlet of reverse osmosis stage 52 may be supplied directly to the fluidized bed crystallizer 30 rather than to first reverse osmosis stage 51, as shown by line 52b. Rather than reducing the concentration of dissolved minerals in the feed water by locating the fluidized bed crystallizer between particular stages as in the example of FIG. 3, the system of FIG. 4 maintains a reduced concentration in a general manner by removing minerals from the recycled brine and using the resulting water to dilute the brine supplied as feed water to each stage. The relative proportion of water supplied to each stage may be controlled as desired, and some or all of the brine from first reverse osmosis stage 51 may be supplied to the fluidized bed crystallizer 30.

In the present example, system 20, 40, or 50 is provided as part of the second pass 12. However, it will be apparent that the systems and configurations described above may be located anywhere as appropriate or desirable in a reverse osmosis system, Product water generated from a water purification or distillation apparatus such as from the water treatment system described herein must treated after purification to adjust the pH to approximately 8. Conventionally this is done performed for example by using carbonation or where appropriate by blending with source water. In this example, the appropriate post-treatment is provided by reintroducing minerals from the fluidized bed crystallizer 30. A post-treatment apparatus (not shown) may receive removed minerals on line 31 from the fluidized bed crystallizer 30 and product water on line 24, 55, and the product water is treated with the recovered minerals to decrease the pH of the treated water to its desired level. The post-treatment apparatus may be any suitable conventional apparatus as desired, depending on the form in which the removed minerals are received from the fluidized bed crystallizer 30. It will be apparent that this modification advantageously provides a simple and on-site method of treating the product water from water reverse osmosis system 10.

In the above description, an embodiment is an example or implementation of the invention. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Furthermore, it is to be understood that the invention can be carried out or practiced in various ways and that the invention can be implemented in embodiments other than the ones outlined in the description above.

Meanings of technical and scientific terms used herein are to be commonly understood as by one of ordinary skill in the art to which the invention belongs, unless otherwise defined.

The invention claimed is:

1. A reverse osmosis desalination system for treating feed water, the feed water containing minerals, the system comprising:
   a reverse osmosis unit comprising a first reverse osmosis stage and a second reverse osmosis stage, each of the reverse osmosis stages having a feed water input, a product water outlet and a brine outlet,
   a fluidized bed crystallizer located in a brine recycling line, and
   at least one further reverse osmosis stage having a feed water input,
   wherein the fluidized bed crystallizer (i) receives, via the brine recycling line, brine from the brine outlet of the first reverse osmosis stage, (ii) treats the brine by removing minerals therefrom, thereby generating treated water, and (iii) passes the treated water directly to both the feed water input of the second reverse osmosis stage and the feed water input of the at least one further reverse osmosis stage, and
   wherein the second reverse osmosis stage is upstream of the first reverse osmosis stage such that brine from the brine outlet of the second reverse osmosis stage is supplied to the feed water input of the first reverse osmosis stage.

2. The system of claim 1, further comprising a first reverse osmosis pass and a second reverse osmosis pass, the second reverse osmosis pass comprising the first reverse osmosis stage and the second reverse osmosis stage, wherein the second reverse osmosis pass is operated at a pH of at least 11.

3. The system of claim 2, wherein product water from the second pass is post-treated by reintroducing at least a portion of the minerals removed by the fluidized bed crystallizer to the product water, thereby adjusting pH of the product water to approximately 8.

4. The system of claim 1, wherein product water from the product water outlet of the first reverse osmosis stage and/or the product water outlet of the second reverse osmosis stage is post-treated by reintroducing at least a portion of the minerals removed by the fluidized bed crystallizer to the product water, thereby adjusting pH of the product water to approximately.

5. The system of claim 1, wherein the fluidized bed crystallizer is configured to precipitate said minerals on a seed material.

6. The system of claim 1, wherein the brine received from at least one of the brine outlets is fed into the fluidized bed crystallizer such that the fluidized bed crystallizer removes the minerals therefrom.

7. The system of claim 1, wherein pH of feed water circulating at any point in the brine recycling line is increased to at least 11.

8. The system of claim 1, wherein pH of effluent from the fluidized bed crystallizer is decreased by addition of acid.

9. The system of claim 1, wherein the fluidized bed crystallizer has an output that is directly connected to (i) the feed water input of the second reverse osmosis stage, (ii) the feed water input of the first reverse osmosis stage, and (iii) the feed water input of the at least one further reverse osmosis stage.

10. The system of claim 1, wherein the reverse osmosis unit is connected to a source of sea water, wherein the sea water is provided, under pressure, from the source to the reverse osmosis unit, to treat the sea water.

11. The system of claim 1, wherein the fluidized bed crystallizer passes the treated water, without mixing the treated water with any other fluid streams, to both the feed water input of the second reverse osmosis stage and the feed water input of the at least one further reverse osmosis stage.

12. A method of operating a reverse osmosis desalination system for treating feed water comprising:
   feeding water to be treated to a first reverse osmosis stage of a reverse osmosis desalination system,
   receiving brine from a brine outlet of the first reverse osmosis stage, passing the brine to a fluidized bed crystallizer to remove minerals, thereby generating treated water from the fluidized bed crystallizer, passing the treated water from an output of the fluidized bed crystallizer to both (i) a feed water inlet of a second reverse osmosis stage of the reverse osmosis desalination system and (ii) a feed water inlet of the first reverse osmosis stage of the reverse osmosis desalination system, the second reverse osmosis stage being upstream of the first reverse osmosis stage, passing the treated water directly from the fluidized bed crystallizer to a feed water input of at least one further reverse osmosis stage, wherein the outlet of the fluidized bed crystallizer is directly connected to both the feed water inlet of the second reverse osmosis stage and the feed water inlet of the first reverse osmosis stage.

13. The method of claim 12, further comprising:
passing the minerals removed from the fluidized bed crystallizer into a salt removal line connected to the fluidized bed crystallizer; and
introducing at least some of the minerals removed by the at least one fluidized bed crystallizer into a post-treatment unit to re-mineralize the water.

14. The method of claim 12, further comprising:
decreasing pH of effluent of the fluidized bed crystallizer by addition of acid.

15. The method of claim 12, wherein the water to be treated is sea water or brackish water.

16. The method of claim 12, wherein the feeding the water to be treated comprises providing sea water or brackish water as the feed water.

17. A reverse osmosis desalination system for treating feed water, the feed water containing minerals, the system comprising:
a reverse osmosis unit comprising a plurality of reverse osmosis stages, the plurality of reverse osmosis stages comprising a first reverse osmosis stage, a second reverse osmosis stage, and further reverse osmosis stages, wherein each of the plurality of reverse osmosis stages comprises a feed water input, a product water outlet and a brine outlet,
a plurality of fluidized bed crystallizers configured to remove minerals from brine received from at least one of the brine outlets, the plurality of fluidized bed crystallizers comprising a first fluidized bed crystallizer, a second fluidized bed crystallizer, and further fluidized bed crystallizers,
wherein at least the first fluidized bed crystallizer is located in a brine recycling line,
wherein at least the first fluidized bed crystallizer directly receives, via the brine recycling line, the brine from the first reverse osmosis stage, treats the brine by removing minerals therefrom, thereby generating treated water, and passes the treated water to the feed water input of the second reverse osmosis stage,
wherein the second reverse osmosis stage is upstream of the first reverse osmosis stage such that brine from the second reverse osmosis stage is supplied to the feed water input of the first reverse osmosis stage,
wherein at least the first fluidized bed crystallizer further passes the treated water directly to the feed water input of one of the further reverse osmosis stages, and
wherein each of the further fluidized bed crystallizers is disposed between a pair of the further reverse osmosis stages at a point where brine concentration approaches its maximum saturation.

18. The system of claim 17, further comprising a post-treatment unit connected to, and receiving minerals from, at least the first fluidized bed crystallizer, wherein the post-treatment unit is operable to reintroduce the minerals to product water until the pH of the product water is approximately 8.

19. The system of claim 17, further comprising a first reverse osmosis pass and a second reverse osmosis pass, the second reverse osmosis pass comprising the first reverse osmosis stage and the second reverse osmosis stage, wherein the second reverse osmosis pass is operated at a pH of at least 11, wherein at least one of the further reverse osmosis stages is disposed upstream of the first reverse osmosis stage, and wherein at least another of the further reverse osmosis stages is disposed downstream of the first reverse osmosis stage.

20. The system of claim 19, wherein the pH is increased to at least 11 by treating the feed water supplied to one or more of the reverse osmosis stages or by treating feed water circulating at any point in the brine recycling line.

* * * * *